United States Patent [19]

Robbins

[11] Patent Number: 4,842,211
[45] Date of Patent: Jun. 27, 1989

[54] FOOTED CASSETTE FOR PHOTOSENSITIVE MATERIAL

[75] Inventor: Daniel H. Robbins, Rochester, N.Y.

[73] Assignee: Itek Graphix Corp., Waltham, Mass.

[21] Appl. No.: 98,484

[22] Filed: Sep. 18, 1987

[51] Int. Cl.[4] ................ B65H 75/00; B65D 85/66
[52] U.S. Cl. .................... 242/71.1; 242/71.7; 206/409; 206/397
[58] Field of Search ............ 242/55.53, 71, 71.1, 242/71.7; 206/397, 416, 413, 415, 408, 409, 389, 407; 354/275, 277

[56] References Cited

U.S. PATENT DOCUMENTS

| | | | |
|---|---|---|---|
| D. 272,633 | 2/1984 | Raymond | D16/32 |
| D. 276,439 | 11/1984 | Raymond | D16/32 |
| 636,047 | 10/1899 | Knobeloch | |
| 875,409 | 12/1907 | Brown | |
| 1,359,458 | 11/1920 | Holinger et al. | |
| 3,128,025 | 4/1964 | Buttery et al. | 225/48 |
| 3,134,525 | 5/1964 | Holcombe | 225/47 |
| 3,193,179 | 7/1965 | Bogren | 206/407 X |
| 3,565,526 | 2/1971 | Van Gemeren | 355/27 |
| 3,606,002 | 9/1971 | Miller | 206/416 X |
| 3,631,971 | 1/1972 | Rinklieb | 206/52 R |
| 3,869,094 | 3/1975 | Weick et al. | 242/55.53 |
| 4,002,238 | 1/1977 | Cameron et al. | 206/408 |
| 4,034,929 | 7/1977 | Ebner, Jr. | 242/71.1 |
| 4,122,949 | 10/1978 | Blatt | 206/408 X |
| 4,160,533 | 7/1979 | Kotzur et al. | 206/397 X |
| 4,212,389 | 7/1980 | Robbins | 206/316 |
| 4,218,135 | 8/1980 | Tsuda et al. | 355/72 |
| 4,248,512 | 3/1981 | Robbins | 354/275 |
| 4,302,102 | 11/1981 | Stark et al. | 355/72 |
| 4,382,510 | 5/1983 | Gaffney | 206/409 X |
| 4,566,785 | 1/1986 | Takenouchi | 355/72 |
| 4,671,409 | 6/1987 | Espy | 242/55.53 X |

FOREIGN PATENT DOCUMENTS 1385192  2/1975  United Kingdom .

OTHER PUBLICATIONS

Itek Graphix 530-550 Brochure.
Photographs (2) of Itek Graphix Cassette for Photosensitive Material.

Primary Examiner—David Werner
Attorney, Agent, or Firm—Morgan & Finnegan

[57] ABSTRACT

A cassette for containing and dispensing a roll of photosensitive material comprising a one-piece generally rectangular cassette body with at least one trihedral corner formed from a sheet of inexpensive material, and providing an orifice therein, a seal along the orifice, molded rectangular cassette end covers disposed at each end of the cassette body and adapted to connect to the ends of the cassette body. The cassette end covers are also adapted to support the roll of photosensitive material within the cassette and to extend beyond the cassette body on the trihedral corners to provide "feet" for the cassette.

5 Claims, 2 Drawing Sheets

FOOTED CASSETTE FOR PHOTOSENSITIVE MATERIAL

BACKGROUND OF THE INVENTION

The present invention relates to the field of cassettes for containing and dispensing rolls of photosensitive material.

Generally rectangular cassettes for containing and dispensing rolls of photosensitive material have been employed for many years. In view of cost factors, these casettes are often manufactured out of cardboard as they are discarded after the roll of photosensitive material is exhausted. One such cartridge is shown in U.S. Pat. No. 4,212,389.

However, it may be appreciated from FIG. 1 of the 389 patent that a generally rectangular shape is not the optimum cassette shape for containing a roll of photosensitive material. Such a package configuration is space inefficient due to the unused volume at each corner of the cassette.

U.S. Pat. No. Des 276,439 shows a generally round cassette for photosensitive material. Although a more space efficient design, a round cassette suffers from many additional limitations. A round cassette cannot be stacked, has a tendency to roll over, and can misalign when inserted into a machine which consumes photosensitive material such as a phototypesetter. Further, a round cassette is not compatible with the current population of machines, originally configured for generally rectangular cassettes, which are already in use.

Accordingly, there is a need for a cassette for containing and dispensing photosensitive material which is space efficient yet does not suffer from the aforementioned drawbacks associated with round cassettes.

SUMMARY OF THE INVENTION

With the foregoing in mind, it is an object of the invention to provide a new and improved cassette for containing and dispensing a roll of photosensitive material.

The cassette according to the invention essentially comprises a generally rectangular cassette body with at least one trihedral corner and formed from a sheet of inexpensive material, such as cardboard. The sheet of inexpensive material that comprises the cassette body is configured so as to provide an orifice in the cassette body from which photosensitive material may be dispensed. A seal is provided along the orifice to prevent light and particulate matter from entering the cassette and ruining the photosensitive material therein. The cassette also includes two molded rectangular cassette end covers disposed at each end of the cassette body.

Molded rectangular cassette end covers are disposed at each end of the cassette body and are adapted to connect thereto. The cassette end covers, in addition to forming the ends of the cassette, provide support for the roll of photosensitive material contained therein and extend beyond the cassette body at the trihedral corners thereby providing "feet" for the cassette.

BRIEF DESCRIPTION OF THE DRAWINGS

The accompanying drawings, referred to herein and constituting a part hereof, illustrate a preferred embodiment of the invention and, together with the description, serve to explain the principles of the invention, wherein.

DETAILED DESCRIPTION OF THE DRAWINGS

Figure 1:
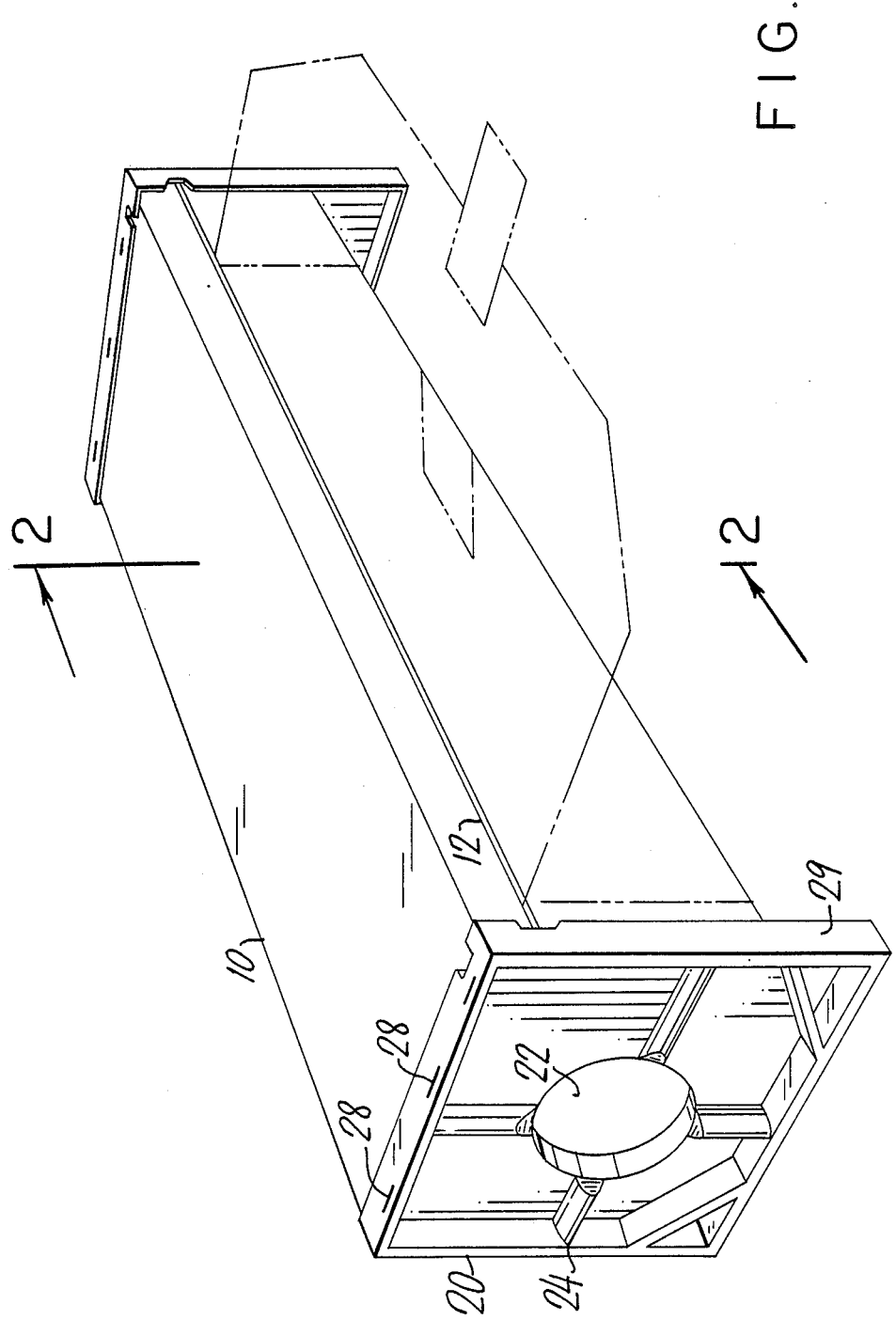
FIG. 1 is a perspective view of a cassette according to the invention.

Referring to the accompanying drawings, a preferred embodiment of the present invention will be explained hereinafter. FIG. 1 shows a cassette for containing and dispensing photosensitive material according to the invention. In FIG. 1, numeral 10 denotes the cassette body and numeral 20 denotes the cassette and covers. Cassette body 10 is formed from a one-piece sheet of inexpensive material such as cardboard. The one-piece sheet is folded or bent to form a generally rectangular enclosure with two trihedral corners and containing a roll of photosensitive material 30 within. An orifice 12 is provided, where the edges of the folded sheet meet, allowing a passageway for dispensing the photosensitive material from the cassette. A seal 16 is provided along orifice 12 to prevent light and particulate matter from entering the cassette and ruining the photosensitive material therein.

Cassette end cover 20 is molded from plastic and includes a circular depression 22 and stiffening ribs 24 molded into its surface. As may be appreciated from FIG. 1, cassette end cover 20 is adapted to connect with the end of cassette body 10 thereby forming a light-tight enclosure for containing the roll of photosensitive material within.

Figure 3:
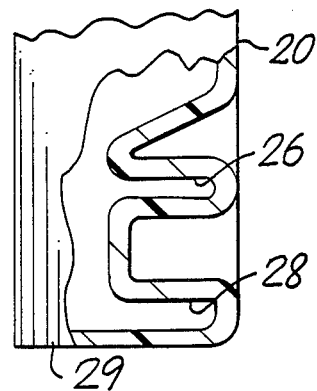
FIG. 3 is a cutaway view of a corner of the molded rectangular cassette end cover.

FIG. 3 shows a cutaway view of one lower corner of cassette end cover 20 illustrating channel 26, which extends generally around the periphery of the cassette end cover and which is of a width slightly less than that of the cardboard sheet. The end of the cassette body is inserted into the channel of the cassette end cover and the cassette end cover pressed thereon. A light-tight seal is thereby achieved and, in addition, the stiffness of the cassette end cover adds rigidity to the entire cassette. Once pressed into place, the cassette end cover may be fixedly attached to the cassette body by any suitable means such as glue, or as illustrated, staples 28.

Figure 2:
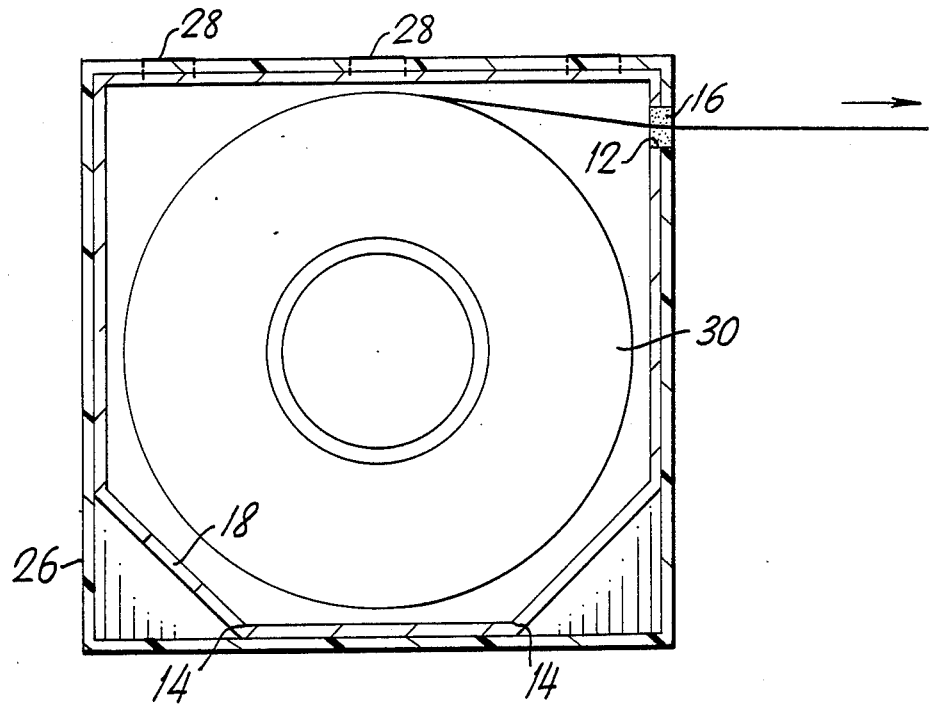
FIG. 2 is a sectional view of the cassette of FIG. 1 taken along the line 2—2.

FIG. 2 is a sectional view of the above-described cassette for containing and dispensing a roll of photosensitive material from which it may be seen that the cassette body is formed in a generally rectangular shape with two trihedral corners 18. It will be understood by the skilled artisan that the number of trihedral corners may be increased or decreased and still obtain the advantageous results achieved by the invention. For purposes of illustration, the number of trihedral corners of the cassette body described herein is two.

When assembled, with a roll of photosensitive material contained within the cassette, the inside diameter of the roll 30 is larger than the diameter of circular depression 22 in the cassette end cover thus allowing the circular depression 22 to fit within and support the ends of the roll of photosensitive material and, due to the rounded surfaces, allow for easy rotation of the roll and dispensing of the photosensitive material through the seal 16 and orifice 12 and out of the cassette.

It will be appreciated from FIG. 2 that, when assembled, the two lower corners 26 of each cassette end cover extend beyond the trihedral corners 18 of cassette body 10. The four extended lower corners 26 of the cassette end covers (two on each side) thereby provide "feet" for the cassette, allow for stacking of cassettes, and prevent the cassettes from rolling over when placed on a flat surface. Further, for those machines that are equipped with a switch to detect proper loading of the cassette, the cassette end cover 20 includes a lateral surface 29 around its outer periphery that is adapted to trip the detection switch thereby indicating that the cassette is properly loaded. Advantageously, such a sensing switch may be situated in the machine in such a location as to take advantage of the additional space provided by virtue of the compact design of the cassette according to the invention (i.e., opposite a trihedral corner of the cassette).

Accordingly, it will be appreciated from the foregoing that the cassette according to the instant invention achieves the space efficiency of a round cassette while also retaining all of the advantages of generally rectangular cassettes. The cassette according to the invention is significantly smaller in cross section and therefore occupies less space in the machine. This space within the machine, where any unused space is at a premium, is therefore available for other uses, e.g., additional machine hardware. Due to the feet on the cassette, a cassette according to the invention will not roll over when placed on a flat surface and is stackable. In addition, misalignment problems when the cassette is placed in the machine are reduced. Advantageously, the configuration of the cassette makes it fully compatible with the existing population of machines currently in use that are adapted to use the generally rectangular cassettes.

Cassettes according to the invention are also particularly useful where a machine is designed by a manufacturer to allow the use of only a particular type of photosensitive material in the machine. The required photosensitive material for that machine may be packaged in the instant cassette and used in the machine whereas standard cassettes, i.e., either generally rectangular or round cassettes, would not fit. Thereby, a manufacturer can insure that only the proper photosensitive material is used with the machine.

While the invention has been described in its preferred embodiment, it is to be understood that the words which have been used are words of description, rather than limitation, and that changes may be made within the purview of the appended claims without departing from the true scope and spirit of the invention in its broader aspects. For example, although in the above-described embodiment the trihedral corners are adjacent to each other, opposing corners of the cassette body may be trihedral. Further, the number of trihedral corners on the cassette body may be varied from as few as one to as many as four.

What is claimed:

1. A cassette for containing and dispensing a roll of photosensitive material, comprising:
   (a) a one-piece generally rectangular cassette body having at least one trihedral corner and formed from a sheet of inexpensive material having an orifice therein;
   (b) a light-tight seal along said orifice;
   (c) molded rectangular cassette end covers disposed at each end of said cassette body, extending beyond the cassette body on the trihedral corners thereof and adapted to connect to the ends of said cassette body to form a light-tight enclosure and support the roll of photosensitive material within said cassette body; and
   (d) means for fixedly attaching said cassette end covers to said cassette body.

2. A cassette according to claim 1, wherein said cassette end covers further include lateral surfaces adapted to cooperate with an alignment detection apparatus.

3. A cassette according to claim 1, wherein said inexpensive material is cardboard.

4. A cassette according to claim 1, wherein said cassette end covers are plastic.

5. A cassette according to claim 1, wherein said means for fixedly attaching said cassette end covers to said cassette body comprise staples.

* * * * *